R. P. SELSOR.
OIL BURNER.
APPLICATION FILED OCT. 27, 1908.

933,674.

Patented Sept. 7, 1909.
2 SHEETS—SHEET 1.

Inventor
Richard P. Selsor.

Witnesses.

By Victor J. Evans
Attorney

R. P. SELSOR.
OIL BURNER.
APPLICATION FILED OCT. 27, 1908.
933,674.
Patented Sept. 7, 1909.
2 SHEETS—SHEET 2.
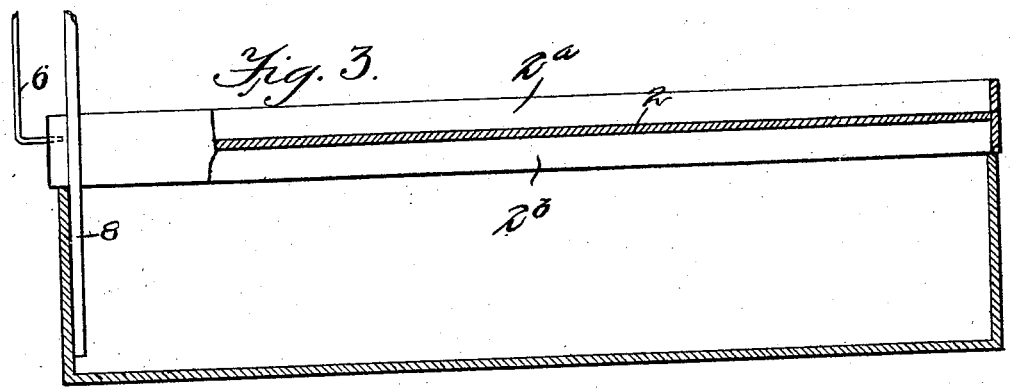
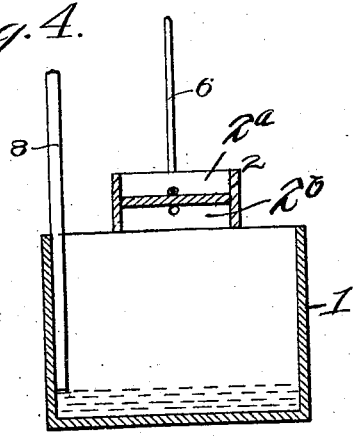
Witnesses
Inventor
Richard P. Selsor.
By Victor J. Evans
Attorney

UNITED STATES PATENT OFFICE.

RICHARD P. SELSOR, OF ENID, OKLAHOMA.

OIL-BURNER.

933,674.  Specification of Letters Patent.  Patented Sept. 7, 1909.

Application filed October 27, 1908. Serial No. 459,751.

*To all whom it may concern:*

Be it known that I, RICHARD P. SELSOR, a citizen of the United States, residing at Enid, in the county of Garfield and State of Oklahoma, have invented new and useful Improvements in Oil-Burners, of which the following is a specification.

This invention relates to crude oil burners, and has for an object to provide a burner of this class that can be applied to the well-known form of kitchen ranges to obviate the use of coal and to enable a range to be heated rapidly and in a simple manner with a minimum expenditure of fuel.

A further object of this invention is to provide a crude oil burner with means for carrying off with products of combustion soot and other foreign matter.

A further object of this invention is to provide a simple and novel form of burner that will consist of but few parts, which may be conveniently removed from a range or stove to be cleaned.

Other objects and advantages will be apparent as the nature of the invention is better set forth, and it will be understood that changes within the scope of the claims may be resorted to without departing from the spirit of the invention.

Figure 1:
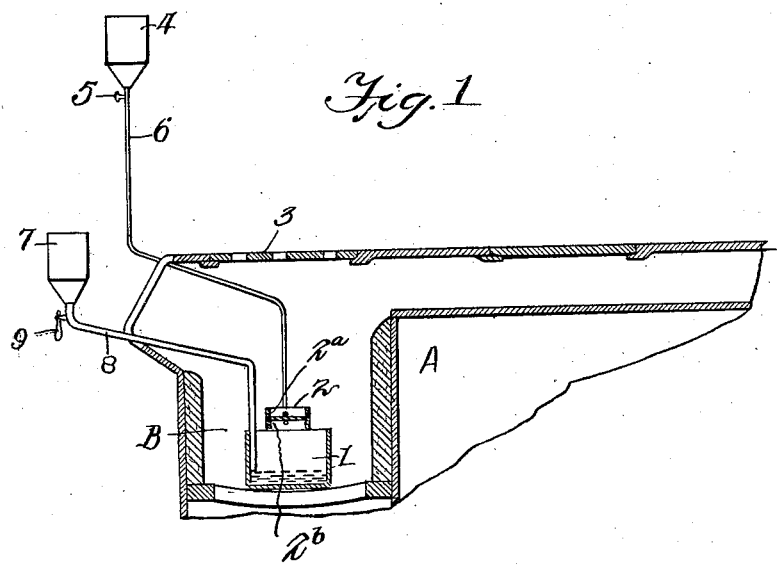
Figure 2:
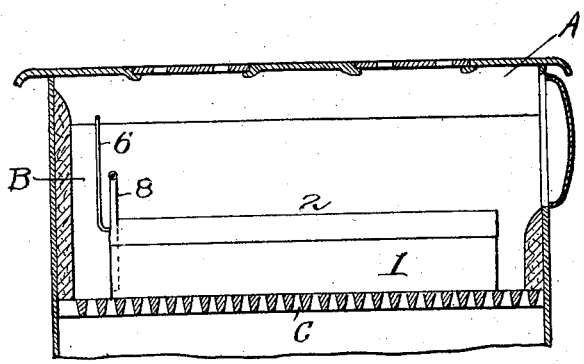

In the drawings, forming a portion of this specification and in which like characters of reference indicate similar parts in the several views:—Figure 1 is a sectional view through the fire box of a range showing the application of the crude oil burner thereto. Fig. 2 is a view taken at right angles to Fig. 1. Fig. 3 is a detail section taken longitudinally of the oil and water pans. Fig. 4 is a transverse sectional view through the same.

Referring now more particularly to the drawings, there is shown a range A of ordinary construction provided with a fire pot B. The fire pot B has located therein the usual grate bars C and the said grate bars support a rectangular pan 1 forming part of my improved crude oil burner. The pan 1 is open at the top thereof and resting upon the ends of the said pan is shown a pan 2 also of rectangular form but it is of such size that its side walls are properly spaced from the side walls of the pan 1. The pan 1 is somewhat deep, and the pan 2 is comparatively shallow for a purpose to be hereinafter described. The range A is provided above the fire pot with a perforated lid 3 adapted to convey air into the fire pot and to form a down draft therein. A tank, indicated at 4, is provided with a suitable valve 5 and controls the passage of oil from the tank through a discharge pipe 6 which has its lower end connected with the pan 2 and is thus located to deliver oil to the said pan as will be readily understood. A tank 7 is provided for the reception of water and a pipe 8 is carried by the said tank and has its lower end disposed above the bottom of the pan 1. A suitable valve 9 is provided for the pipe 8 and is adapted to regulate the discharge of water from the tank 7.

In practice, the oil is discharged from the tank 4 and enters or is conveyed to the pan 2 where it may be ignited. When starting the burner, water is conveyed from the tank 7 to the pan 1. It will be seen that air passing downwardly into the fire pot mixes with the oil fumes and forms a perfect combustion and consequently creates an intense heat. After oil has been delivered to the pan 2 to the extent that the said pan overflows, the oil drips from the sides of the pan 2 and falls upon the surface of the water within the said plan. By this action it is obviously apparent that steam is created which is also mixed with the products of combustion and the steam together with assisting in forming perfect combustion effectively serves to carry off with the said products of combustion soot or other foreign matter.

It will be seen that an extremely simple and inexpensive oil burner is provided which is particularly desirable for use in burning crude oil and which may be conveniently attached to the well known forms of kitchen ranges or to stoves of any construction.

The pan 2 is provided with two compartments 2ᵃ and 2ᵇ so that the said pan can be inverted and exposed to the heat from pan 1 to effectively burn up all sediment as will be understood.

Having thus described the invention what I claim as new, is:—

1. In an oil burner, a water container having an open top portion, a pan mounted upon the end walls of the container and having its side walls disposed in spaced relation to the side walls of said container to open communication between the pan and said container, said pan having a plurality of shallow oil containing compartments, an oil supply tank connected with the pan, and a water supply tank connected with the container.

2. In an oil burner, the combination with a stove having a fire pot and a perforated lid disposed above the pot, of a water receptacle mounted in the fire pot and comprising a rectangular pan having an open top portion, a tank, a pipe carried by the tank having its lower end mounted in the pan and disposed in spaced relation to the bottom thereof, an oil receptacle removably mounted upon the water receptacle and comprising a pan having a plurality of shallow compartments, the side walls of the oil pan being disposed in spaced relation to the side walls of the water pan so that oil can flow by gravity into the water pan, and an oil tank connected with the oil pan.

In testimony whereof I affix my signature in presence of two witnesses.

RICHARD P. SELSOR.

Witnesses:
 JOEL GILES,
 D. W. ROBINSON.